United States Patent [19]

Keillor

[11] 4,141,203
[45] Feb. 27, 1979

[54] FRUIT HARVESTER

[75] Inventor: Benjamin O. Keillor, Wasco, Calif.

[73] Assignee: Chisholm-Ryder Company, Inc., Niagara Falls, N.Y.

[21] Appl. No.: 859,126

[22] Filed: Dec. 9, 1977

Related U.S. Application Data

[63] Continuation of Ser. No. 649,017, Jan. 14, 1976, abandoned.

[51] Int. Cl.² ............................................. A01D 46/24
[52] U.S. Cl. .................................................. 56/328 R
[58] Field of Search ...................... 56/330, 328 R, 329, 56/328 TS

[56] References Cited

U.S. PATENT DOCUMENTS

| | | | |
|---|---|---|---|
| 3,184,908 | 5/1965 | Rust | 56/330 |
| 3,203,159 | 8/1965 | Weygandt et al. | 56/1 |
| 3,325,984 | 6/1967 | Christie et al. | 56/330 |
| 3,494,117 | 2/1970 | Weygandt et al. | 56/330 |
| 3,522,696 | 8/1970 | Millier et al. | 56/328 R |
| 3,613,343 | 10/1971 | Sagouspe et al. | 56/330 |
| 3,703,072 | 11/1972 | Patzlaff | 56/330 |
| 3,727,388 | 4/1973 | Smith | 56/330 |
| 3,774,381 | 11/1973 | Burton | 56/330 |
| 3,890,775 | 6/1975 | Bruel | 56/330 |

*Primary Examiner*—Russell R. Kinsey
*Attorney, Agent, or Firm*—Stanley J. Price, Jr.; John M. Adams

[57] ABSTRACT

A vertical frame is supported forwardly on a self-propelled mobile frame that includes a longitudinal conveyor. A gathering device is supported by the mobile frame and extends laterally at an inclined slope from the conveyor to direct the harvested fruit onto the conveyor. A shaker mechanism includes a plurality of spaced vertically extending bellcrank levers that are rotatably journaled at their end portions to the vertical frame member. A plurality of horizontally positioned shaker rods are secured in spaced parallel relationship on the levers. The bellcrank levers are linked by eccentric mechanisms to the output shaft of a motor. Rotation of the output shaft rectilinearly orbits the eccentrics in a horizontal plane to oscillate the levers back and forth and horizontally move the shaker rods to compact and vibrate the limbs of the tree and thereby dislodge the fruit from the limbs. A limb separator mounted on the vertical frame member includes a plurality of vertically spaced parallel horizontally extending lifting rods that are supported by a tubular member. A motor mounted on the vertical frame is connected by a chain drive and a gear box to the tubular member and is operable to vertically oscillate the tubular member and the lifting rods. The lifting rods engage the limbs of the tree and exert a lifting force thereupon to separate and divide the limbs to facilitate removal of the fruit from the limbs by the horizontally movable shaker rods.

18 Claims, 2 Drawing Figures

FRUIT HARVESTER

CROSS REFERENCE TO RELATED APPLICATION

This application is a continuation of application Ser. No. 649,017 filed on Jan. 14, 1976, entitled "Fruit Harvester" and now abandoned.

BACKGROUND OF THE INVENTION

1. Field of the Invention

This invention relates to a fruit harvester and more particularly to a machine for picking fruit from a tree by a plurality of horizontally and vertically oscillating rod members that dislodge the fruit from the tree with the harvested fruit deposited onto a conveyor and transported to a storage container on the machine.

2. Description of the Prior Art

U.S. Pat. Nos. 3,561,205 entitled, "Fruit Harvester" and 3,713,282 "Harvesting Apparatus" disclose a picking unit that is connected by a hydraulically controlled boom to a conventional tractor or the like. The picking unit includes a plurality of tree penetrating rods that extend horizontally from a main frame and are positioned in spaced vertical relationship thereon. The rods are reciprocated horizontally outwardly away from each other and inwardly toward each other with the adjacent rows of rods moving in opposite directions. In this manner, the fruit stems are severed and the picked fruit falls upon a gathering tray mounted below the picking unit. The picked fruit is directed therefrom to a central discharge tube through which the fruit is moved to a loading point.

The actual picking of the fruit is accomplished by the severing of the fruit stems by the synchronized movement of the rods. Thus, the fruit stems must be severed in order to dislodge the fruit from the limbs; and accordingly, the fruit not severed from the limbs remains on the tree. There is need for a mobile fruit harvesting machine that harvests fruit from a tree at a high rate of speed in which substantially all of the fruit is removed from the tree without damaging the tree and the picked fruit.

SUMMARY OF THE INVENTION

In accordance with the present invention, there is provided a machine for harvesting fruit that includes a mobile frame with a vertical frame member positioned forwardly thereon. A shaker mechanism is rotatably supported on the vertical frame member and is operable upon actuation to impart oscillating, horizontal rectilinear movement upon the limbs of the plant. A drive assembly is connected to the shaker mechanism and is operable to oscillate the shaker mechanism in timed relation to thereby dislodge the fruit from the plants. A conveyor mechanism is positioned longitudinally on the mobile frame to convey the harvested fruit rearwardly to a storage container. A gathering device is supported by the mobile frame and extends laterally from the conveying mechanism. The gathering device receives the fruit harvested from the plants and directs the fruit onto the conveyor mechanism.

A separating mechanism is rotatably supported on the vertical frame adjacent the shaker mechanism and is operable to impart oscillating, vertical rectilinear movement upon the limbs of the plant. The separating mechanism includes a plurality of lifting rods that are supported horizontally on a tubular member which is rotatably supported at the end portions thereof on the vertical frame member. A drive assembly mounted on the vertical frame member is connected to the tubular member and is operable to transmit vertical oscillating movement through the tubular member to the lifting rods. In this manner, the lifting rods move vertically relative to the horizontally moving shaker mechanism.

The shaker mechanism includes a plurality fo bellcranktype levers vertically positioned and rotatably supported on the vertical frame member. A plurality of shaker rods are secured horizontally to the members and are positioned vertically in spaced parallel relation thereon. The shaker rods of adjacently positioned levers are arranged in overlying staggered relation to permit unobstructed movement therebetween. A separate drive mechanism mounted on the vertical frame member transmits horizontal oscillating movement by the levers to the secured rods. In this manner, the shaker rods are oscillated back and forth in timed relationship to each other and thus subject the limbs of the tree to an undulating force.

Accordingly, the principal object of the present invention is to provide a machine for harvesting fruit that includes a plurality of horizontally positioned shaker rods that are oscillated back and forth on the mobile frame of the machine to engage the limbs of the plant and dislodge the fruit therefrom.

Another object of the present invention is to provide a mobile harvesting machine that includes a limb separator that oscillates vertically on the mobile frame in coordination with the horizontally oscillating shaker rods to separate entangled limbs of the plant to facilitate removal of the fruit by the shaker rods.

An additional object of the present invention is to provide a mobile fruit harvesting machine that includes a plurality of horizontally and vertically oscillating rod members that engage the limbs of the plant to dislodge the fruit which is gathered by a gathering device on the frame and directs the harvested fruit onto a rearwardly moving longitudinal conveyor which transports the harvested fruit to a storage container.

These and other objects of the present invention will be more completely described and disclosed in the following specification, the accompanying drawings and the appended claims.

DESCRIPTION OF THE PREFERRED EMBODIMENTS

Figure 1:
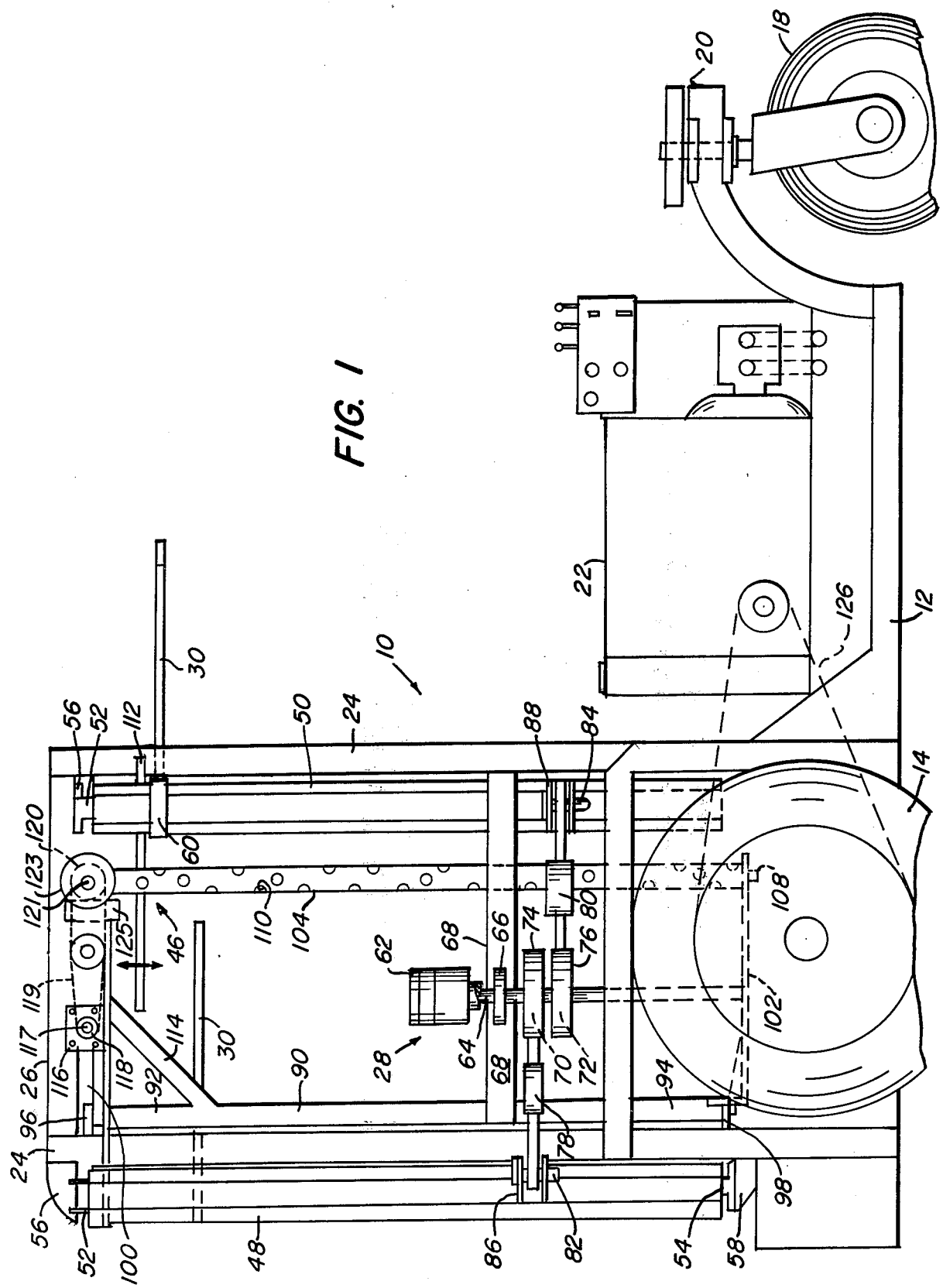
FIG. 1 is a view in side elevation of the fruit harvester, illustrating the horizontally movable shaker arms and the vertically movable limb separator.

Referring to the drawings, there is illustrated a fruit harvesting machine generally designated by the numeral 10 which includes a mobile main frame 12 that is mounted at the forward end portion on a driven wheel 14 and a carrier wheel 16. The rearward end portion of the main frame 12 is mounted on a steering wheel 18 which is coupled through linkage 20 to a suitable steering mechanism (not shown). The harvester 10 is propelled by a suitable drive mechanism, such as hydraulic motor 22 that is a mounted on the main frame 12 and drivingly connected to the forward wheel 14. The machine operator is located on the main frame 12 rearwardly of the engine 22 and adjacent to the steering mechanism, however, the operator may also be located forwardly of the driven wheel 14 on the main frame 12.

Frame members 24 extend vertically from the main frame 12 and are connected at their upper end portions by crossbars 26. A shaker mechanism generally designated by the numeral 28 is supported by the vertical members 24 and crossbars 26 and includes a plurality of shaker rods 30 that are arranged to oscillate rectilinearly in a horizontal plane to dislodge the fruit from the limbs of the tree as the harvester 10 moves along the row of trees to be harvested. The fruit falls onto a gathering device generally designated by the numeral 32 that extends outwardly from the main frame 12 and is supported by a lateral extension 34 of the main frame 12. A gathering apron 36 is positioned on the lateral frame 34 and is sloped downwardly so that the harvested fruit falls upon the apron 36 and is directed down the sloped surface thereof onto a delivery conveyor 38 that extends longitudinally on the main frame 12.

The conveyor 38 is propelled to move the picked fruit rearwardly on the main frame 12. With this arrangement, the fruit is directed down the sloped surface of the gathering apron 36 and onto the delivery conveyor 38 and is moved rearwardly thereon. The conveyor 38 has a discharge end portion 40 that is positioned in overlying relationship with the receiving end portion of an elevating conveyor 42. The elevating conveyor 42 has a discharge end portion 44 that is positioned in overlying relationship with a container (not shown) mounted on the mobile frame 12 into which the picked fruit is deposited for storage and processing. A conventional separating device, such as a fan (not shown), may be positioned on the frame 12 adjacent the discharge end portion 44 to separate the foliage and debris from the fruit as it is deposited into a suitable storage container. A vertically movable limb divider generally designated by the numeral 46 is supported by the vertical frame members 24 and the crossbars 26 adjacent the shaker mechanism 28. The limb divider 46 is operable to lift and separate entangled branches of the fruit tree to facilitate the removal of the fruit from the branches by the shaker mechanism 28.

The shaker mechanism 28 includes a plurality of vertical bellcrank-type of levers, such as levers 48 and 50. The levers 48 and 50 have end portions 52 and 54 that are journaled in bearings 56 and 58 respectively. The shaker rods 30 are rigidly secured to the levers 48 and 50 by arm members 60. The arm members 60 are secured in spaced parallel relationship on the levers 48 and 50 between the end portions thereof. As illustrated in FIG. 1, the arm members 60 are positioned in staggered relationship on the respective levers 48 and 50 so that the shaker rods 30 of the respective levers are positioned in spaced parallel staggered relationship along the length of the levers. For purposes of illustration, not all of the arm members 60 and shaker rods 30 are illustrated in FIG. 1; however, it should be understood that the arm members 60 with the shaker rods 30 are positioned in vertical spaced relationship along the entire length of the levers 48 and 50.

Figure 2:
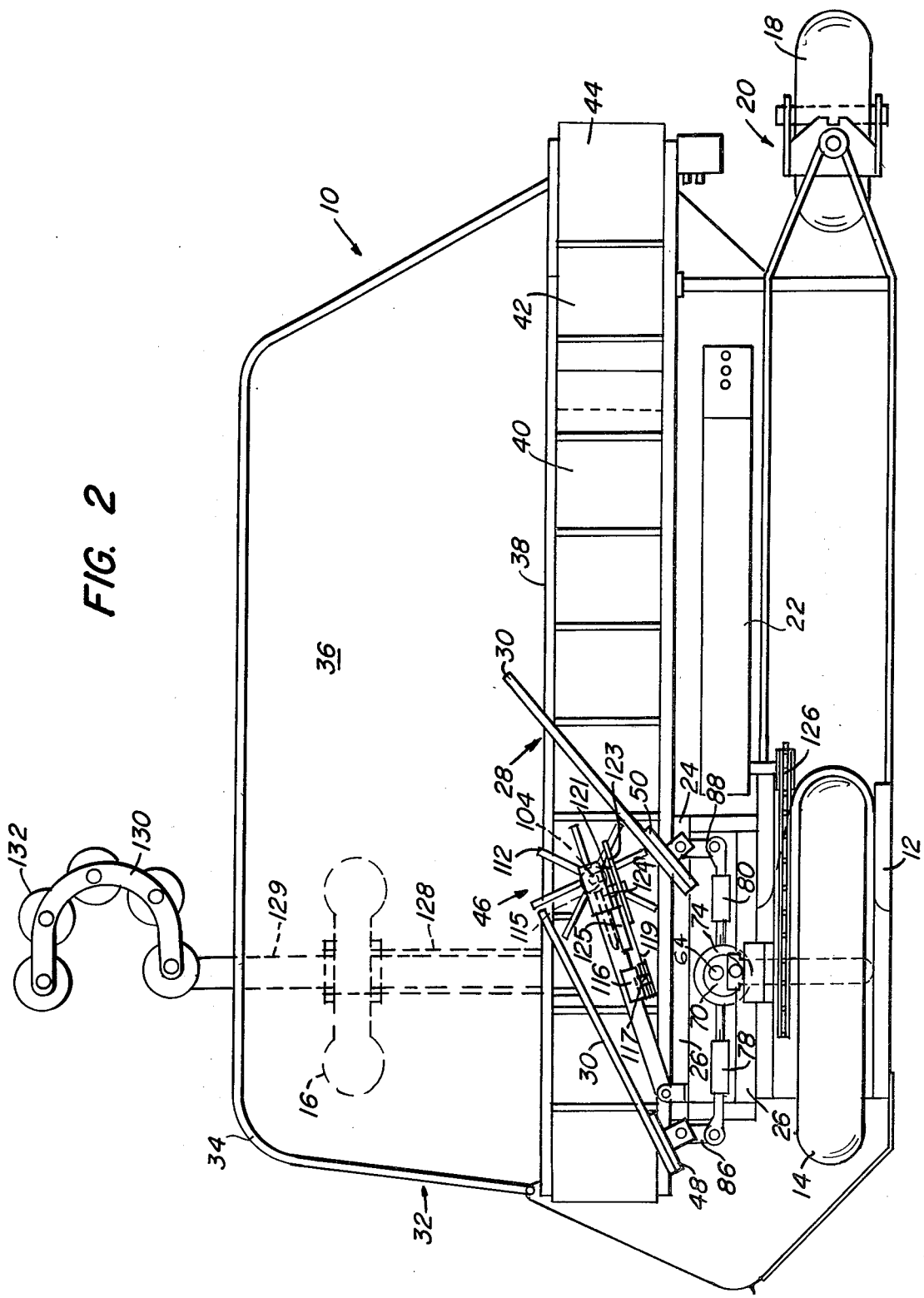
FIG. 2 is a top plan view of the fruit harvester illustrated in FIG. 1.

With the shaker rods 30 positioned horizontally on the levers 48 and 50 in vertical spaced parallel, staggered relationship, a motor 62, preferably hydraulically operated and controlled, effects synchronized oscillation of the shaker rods 30 in a horizontal plane to strike the fruit stems and thereby sever the fruit from the limbs of the tree. The motor 62 includes an output shaft 64 that is journaled at one end in bearing 66. The bearing 66 is secured to a brace member 68 that extends between the vertical frame members 24. The output shaft is rotatably supported at its opposite end in a bearing (not shown) that is also supported by the frame members 24. Eccentrics 70 and 72 are journaled within collars 74 and 76 that are attached at one end portion to turnbuckle links 78 and 80, respectively. The opposite end portions of the turnbuckle links 78 and 80 are pivotally secured by pin members 82 and 84 to clevis connections 86 and 88, respectively. The clevis connections 86 and 88, as illustrated in FIG. 2, are, in turn, pivotally connected to the bellcrank levers 48 and 50.

Operation of motor 62 rotates the output shaft 64 to rectilinearly orbitally drive the collars 74 and 76 through the eccentrics 70 and 72 to oscillate back and forth the bellcrank levers 48 and 50 transversely relative to the main frame 12. In response to the oscillation of the levers 48 and 50, the shaker rods 30 move transversely of the harvester. The eccentrics 70 and 72 may be arranged 180° out of phase to each other so that the respective rods 30 thereof move toward and away from each other in overlying horizontal planes. On the other hand, the eccentrics 70 and 72 may be arranged in phase so that the respective shaker rods 30 synchronously move in unison to dislodge the fruit from the branches of the tree. Thus, as the harvester 10 moves along a row of trees to be harvested, the shaker rods 30 penetrate the tree to contact the outwardly extending limbs and compress the limbs between the oscillating arms, as the harvester is forwardly moved.

As the shaker rods 30 contact the limbs of the tree, the fruit on the outer branches is initially dislodged by the movement of the shaker rods 30 severing the stem connecting the fruit to the limb. As the harvester 10 continues to move forward, the rods 30 are extended further among the branches of the tree to compress the branches between the rods. By oscillation of the rods, undulating movement of the tree limbs is generated to dislodge the fruit. In addition, the fruit is dislodged from the limbs by contact of the rods with the fruit stems to sever the stems from connection with the limbs. The dislodged fruit falls upon the gathering apron 36 and is directed down the inclined slope of the apron onto the delivery conveyor 38. The delivery conveyor 38 moves rearwardly to discharge the fruit onto the elevating conveyor 42 and from the discharge end 44 thereof into a suitable storage container (not shown) with the extraneous foliage and debris removed by a separation fan (not shown).

The limb separator 46 for disentangling the branches of the fruit tree to facilitate the removal of the fruit by the oscillating shaker rods 30 includes a vertical frame member 90 having end portions 92 and 94 that are journaled in bearings 96 and 98 on the vertical frame members 24 to permit lateral pivotal movement of the frame member 90. A brace member 100 is secured at one end portion to the frame member end portions 92 and extends horizontally therefrom. A resilient member 102 is secured to the frame member end portion 94 and extends horizontally therefrom. A tubular member 104 extends vertically between the brace member 100 and the resilient member 102 and has end portion 108 that is secured to the resilient member 102. The opposite end portion of tubular member 104 is supported for vertical movement in a manner hereinafter described in greater detail.

A plurality of apertures 110 extend through the tubular member 104 and are provided in a staggered arrangement the length of the tubular member 104. Rod members 112 extend through the apertures 110 and are thereby retained in spaced parallel relationship on the tubular member 104. The tubular member 104 is supported by the movable frame member 90 between the bellcrank levers 48 and 50 of the shaker mechanism 28 so that vertical reciprocal movement of the rod members 112 does not interfere with the horizontal reciprocal movement of the shaker rods 30. However, equal efficiency of the limb separator 46 can be attained by positioning the tubular member 104 forwardly of the bellcrank lever 48.

A mounting bracket 114 extends outwardly from the frame member 90 adjacent the end portion 92 and rigidly supports a motor 116, which is preferable hydraulically controlled. The motor 116 includes an output shaft 117 that is keyed to a sprocket 118 that is drivingly connected by a chain 119 (schematically illustrated) to a sprocket 120 nonrotatably secured to an input shaft 121 of gear box 124. The gear box 124 is also supported by the mounting bracket 114. An actuating arm 115, illustrated in FIG. 2, extends from the gear box 124 and is drivingly connected to the gear train thereof so that rotation of the output shaft 117 is transmitted by the chain drive to the gear box 124 to generate vertical reciprocation of the actuating arm. The actuating arm 115 is pinned to the upper end portion of the tubular member 104 to transmit the vertical reciprocation thereto having the end portion 108 resiliently supported on spring 102. In this manner, the lifting rods 112 oscillate upwardly and downwardly between the horizontally oscillating shaker rods 30.

Preferably, the lifting rods 112 move through a vertical distance about 4 inches; however, the limits of vertical movement of the lifting arms 112 may be adjusted by the connection of the actuating arms of the gear box 124 with the end portion of the tubular member 104. A flywheel 123 is nonrotatably secured to the input shaft of the gear box 124 and a counterweight 125 is supported by the casing of the gear box 124 adjacent the upper end of the tubular member 104. The flywheel 123 and the counterweight 125 function to balance the forces acting upon the tubular member 104 and eliminate jerkiness in the vertical receprocal movement thereof. In addition, the counterweight 125 offsets the weight of the tubular member 104 to assure uniform reciprocal movement of the tubular member.

As the harvester 10 moves along the row of trees to be harvested, the shaker mechanism 28 together with the limb separator 46 engages the limbs of the tree. The vertical oscillating movement of the lifting rods 112 synchronized with the horizontally oscillating movement of the shaker rods 30 applies a lifting force upon the limbs to disentangle and separate the limbs of the tree. In this manner, the fruit on the limbs becomes more accessible to the oscillating action of the shaker rods 30. In addition to the function of disentangling the limbs the lifting rods 112 also serve to dislodge fruit from the limbs of the tree by the vertical oscillating movement in combination with the horizontal oscillating movement of the shaker rods 30. Preferably, the frequency of oscillation of the vertically movable lifting rods 112 is one half the frequency of oscillation of the horizontally moving shaker rods 30.

It is also intended with the practice of the present invention, that the vertical frame members 24 which support the shaker mechanism 28 and the limb separator 46 be pivotally connected at their lower end portion to the main frame 12 to permit a variation in the inclination of the frame member 24 with the shaker mechanism 28 and the limb separator 46 relative to the vertical axis of the main frame 12. With arrangement piston cylinder assemblies (not shown) are mounted on the main frame 12 and include extensible piston rods that are pinned to the lower end portion of the vertical frame members 24 adjacent their pivotal connection to the main frame 12. The piston cylinder assemblies are hydraulically controlled by the operator and are operable upon actuation to extend the piston rods. Extension of the piston rods urges the vertical frame members to pivot from a vertical position, as illustrated in FIG. 1, to a position inclined at an angle from the vertical position. In this manner, the shaker mechanism 28 and the limb separator 46 are inclined while the harvester 10 is moving along a row of fruit trees. This would be particularly desirable as the slope of the terrain changes which, in turn, changes the inclination of the harvester frame relative to the fruit trees.

By varying the inclination of the vertical frame members 24, the shaker rods 30 of the shaker mechanism 28 and the lifting rods 112 of the limb separator 46 are maintained in the same relative position to the fruit trees not withstanding a change in the orientation of the main frame 12 to the fruit trees. In addition, by varying the inclination of the vertical frame members 24, it is possible to place the shaker rods 30 and the lifting rods 110 in closer contact with the limbs of the fruit tree and thus increase the efficiency of the shaker mechanism and the limb separator to harvest the fruit from the trees. In this manner, the versatility of the harvester is enhanced.

Referring to FIG. 2, there is illustrated the carrier wheel 16 that is rotatable supported on the axle upon which the driven wheel 14 is propelled by a chain 126 that is reeved around a sprocket that is nonrotatably secured to the axle. The opposite end portion of the chain 126 is reeved around a driven sprocket that is drivingly connected through conventional gearing to the hydraulic motor 22. In this manner, the drive is transmitted to the wheel 14 to forwardly propel the harvester 10. A hydraulic ram 128 extends outwardly from the main frame 12 and is coaxially positioned with the driven axle and includes an extensible piston 129. The extensible piston 129 has an end portion extending beyond the periphery of the gathering apron 36 and is connected to a semicylindrical collar 130 of a preselected diameter. A plurality of roller members 132 is rotatably secured to the collar 130 and extends beyond the side edges thereof. With this arrangement, the collar 130 may be extended by operation of the ram 128 to move the piston 129 outwardly from the harvester 10 so that the collar 130 may be positioned in surrounding relationship with the trunk of the fruit tree to be harvested. The roller members 132 are positioned in abutting relation with the tree trunk to prevent damage to the tree.

With the collar 130 surrounding the trunk of a tree, the harvester 10 may be anchored at a preselected radius from the tree so that the harvester may be propelled in a circle, a fixed radius from the tree. The shaker rods 30 and the lifting rods 112, positioned in contact with the limbs of the trees, oscillate horizontally and vertically as the harvester circles the tree to dislodge the fruit from the limbs. The fruit falls upon the apron 36 of the gathering device 32 and is directed down the slope thereof onto the delivery carrier 38. The harvested fruit is then moved rearwardly onto the elevating conveyor 42 and from the discharge end 44 thereof into a suitable storage container mounted in material receiving relationship with the discharge end 44.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A machine for harvesting fruit comprising,
   a mobile frame,
   an upwardly extending frame member positioned on said mobile frame,
   first and second shaker means rotatably supported by said upwardly extending frame member for imparting oscillating horizontal rectilinear movement upon the limbs of the plants to be harvested,
   said first and second shaker means being positioned in spaced relation on said mobile frame,
   said first and second shaker means each including penetrating means extending outwardly from said frame member and adapted to extend into contact with the limbs of the plants and generate an undulating movement of the limbs to dislodge the fruit therefrom,
   drive means drivingly connected to said first and second shaker means for oscillating said first and second shaker means in timed relation to each other to dislodge the fruit from the plants,
   conveying means positioned for conveying the harvested fruit on said mobile frame,
   gathering means supported by said mobile frame and extending laterally of said conveying means for receiving the fruit harvested from the plants and directing the harvested fruit onto said conveying means, and
   said gathering means including a gathering surface extending outwardly from and sloping downwardly toward said conveying means, said gathering surface extending laterally beyond said penetrating means so that the harvested fruit is collected by said gathering means and directed down said gathering surface thereof onto said conveying means.

2. A machine for harvesting fruit as set forth in claim 1 which includes,
   said conveying means being positioned longitudinally on said mobile frame and thereby operable to convey the harvested fruit longitudinally on said mobile frame, and
   said first and second shaker means being positioned adjacent one side of said conveying means and spaced longitudinally along said conveying means.

3. A machine for harvesting fruit as set forth in claim 1 which includes,
   said conveying means having a receiving end portion and a discharge end portion,
   said conveying means being operable to convey the harvested fruit rearwardly on said mobile frame from said receiving end portion to said discharge end portion, and
   said gathering means being operable to direct the harvested fruit onto said conveying means receiving end portion.

4. A machine for harvesting fruit as set forth in claim 3 which includes,
   a selected one of said first and second shaker means being positioned on said mobile frame adjacent to said conveying means receiving end portion.

5. A machine for harvesting fruit comprising,
   a mobile frame,
   an upwardly extending frame member positioned on said mobile frame,
   first and second shaker means rotatably supported by said upwardly extending frame member for imparting oscillating horizontal rectilinear movement upon the limbs of the plants to be harvested,
   said first and second shaker means being positioned in spaced relation on said mobile frame,
   drive means drivingly connected to said first and second shaker means for oscillating said first and second shaker means in timed relation to each other to dislodge the fruit from the plants,
   conveying means extending longitudinally on said mobile frame for conveying the harvested fruit longitudinally on said mobile frame,
   gathering means supported on said mobile frame and extending laterally of said conveying means for receiving the fruit harvested from the plants and directing the harvested fruit onto said conveying means, and
   means extending outwardly from said mobile frame for engaging the plant to position said mobile frame a preselected distance therefrom.

6. A machine for harvesting fruit as set forth in claim 5 which includes,
   said conveying means having a receiving end portion and a discharge end portion, and
   said conveying means being operable to convey the harvested fruit rearwardly on said mobile frame from said receiving end portion to said discharge end portion.

7. A machine for harvesting fruit as set forth in claim 6 in which,
   said first and second shaker means each includes penetrating means extending outwardly from said frame member and adapted to extend into contact with the limbs of the plants and generate an undulating movement of the limbs to dislodge the fruit therefrom, and
   a selected one of said first and second shaker means being positioned on said mobile frame adjacent to said conveying means receiving end portion.

8. A machine for harvesting fruit comprising,
   a mobile frame,
   an upwardly extending frame member positioned on said mobile frame,
   first and second shaker means rotatably supported by said upwardly extending frame member for imparting oscillating horizontal rectilinear movement upon the limbs of the plants to be harvested,
   said first and second shaker means being positioned in spaced relation on said mobile frame,
   drive means connected to said first and second shaker means for oscillating said first and second shaker means in timed relation to each other to dislodge the fruit from the plants,
   separating means rotatably supported on said upwardly extending frame member between said first and second shaker means for imparting oscillating vertical rectilinear movement upon the limbs of the plants, said separating means being operable to separate the limbs of the plant to facilitate dislodging of the fruit from the limbs by said first and second shaker means, conveying means positioned for conveying the harvested fruit longitudinally on said mobile frame, and gathering means supported by said mobile frame and extending laterally of said conveying means for receiving the fruit harvested from the plants and directing the harvested fruit onto said conveying means.

9. A harvesting machine as set forth in claim 8 in which said separating means includes, a tubular member resiliently supported at one end portion thereof on said upwardly extending frame member adjacent said shaker means, a plurality of lifting rods secured horizontally to said tubular member and positioned vertically in spaced parallel relation thereon, and drive means mounted on said upwardly extending frame member and drivingly connected to the other end portion of said tubular member for vertically oscillating said lifting rods relative to the horizontal oscillating movement of said first and second shaker means.

10. A harvesting machine as set forth in claim 8 which includes, means extending outwardly from said mobile frame for engaging the plant to position said mobile frame a preselected distance therefrom.

11. A harvesting machine as set forth in claim 10 which includes, a ram assembly connected at one end portion to said mobile frame, said ram assembly having an extensible rod member positioned therein, a semicircular collar secured to the end portion of said rod member, a plurality of rollers rotatably secured to said semicircular collar, and said rod member extensible upon operation of said ram assembly to position said collar in engagement with the base of the plant to thereby anchor said mobile frame a preselected distance from the plant as said mobile frame moves around the plant.

12. A harvesting machine as set forth in claim 8 in which said first and second shaker means each includes, a plurality of levers vertically positioned and rotatably supported on said upwardly extending frame member, a plurality of shaker rods secured horizontally to said levers and positioned vertically in spaced parallel relation thereon, said shaker rods of adjacently positioned levers arranged in overlying staggered parallel relation to permit unobstructed movement therebetween, and drive means mounted on said upwardly extending frame member and drivingly connected to said levers for horizontally oscillating said shaker rods in timed relation to each other.

13. A harvesting machine as set forth in claim 8 in which said gathering means includes, a gathering apron secured to said mobile frame below said first and second shaker means and extending outwardly therefrom, and said gathering apron having a surface sloped toward said conveyor means and positioned in material receiving relation with the fruit dislodged from the plants to direct the harvested plants onto said conveying means.

14. A machine for harvesting fruit as set forth in claim 1 which includes, separating means rotatably supported on said upwardly extending frame member between said first and second shaker means for imparting oscillating vertical rectilinear movement upon the limbs of the plants, and said separating means being operable to separate the limbs of the plant to facilitate dislodging of the fruit from the limbs by said first and second shaker means.

15. A machine for harvesting fruit as set forth in claim 14 in which said separating means includes, a tubular member resiliently supported at one end portion thereof on said upwardly extending frame member adjacent said shaker means, a plurality of lifting rods secured horizontally to said tubular member and positioned vertically in spaced parallel relation thereon, and drive means mounted on said upwardly extending frame member and drivingly connected to the other end portion of said tubular member for vertically oscillating said lifting rods relative to the horizontal oscillating movement of said first and second shaker means.

16. A machine for harvesting fruit as set forth in claim 1 which includes, means extending outwardly from said mobile frame for engaging the plant to position said mobile frame a preselected distance therefrom.

17. A machine for harvesting fruit as set forth in claim 16 in which said means extending outwardly from said mobile frame for engaging the plant includes, a ram assembly connected at one end portion to said mobile frame, said ram assembly having an extensible rod member positioned therein, a semicircular collar secured to the end portion of said rod member, a plurality of rollers rotatably secured to said semicircular collar, and said rod member extensible upon operation of said ram assembly to position said collar in engagement with the base of the plant to thereby anchor said mobile frame a preselected distance from the plant as said mobile frame moves around the plant.

18. A machine for harvesting fruit as set forth in claim 5 in which said means extending outwardly from said mobile frame for engaging the plant includes, a ram assembly connected at one end portion to said mobile frame, said ram assembly having an extensible rod member positioned therein, a semicircular collar secured to the end portion of said rod member, a plurality of rollers rotatably secured to said semicircular collar, and said rod member extensible upon operation of said ram assembly to position said collar in engagement with the base of the plant to thereby anchor said mobile frame a preselected distance from the plant as said mobile frame moves around the plant.

* * * * *